United States Patent
Atkinson (10) Patent No.: US 11,328,466 B2
(45) Date of Patent: *May 10, 2022

(54) METHOD AND USER INTERFACE FOR GENERATING TANGENT VECTOR FIELDS USABLE FOR GENERATING COMPUTER GENERATED IMAGERY

(71) Applicant: Weta Digital Limited, Wellington (NZ)

(72) Inventor: Kevin Atkinson, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/105,390

(22) Filed: Nov. 25, 2020

(65) Prior Publication Data
US 2022/0108511 A1   Apr. 7, 2022

Related U.S. Application Data

(60) Provisional application No. 63/088,952, filed on Oct. 7, 2020.

(51) Int. Cl.
*G06T 13/40* (2011.01)
*G06T 17/20* (2006.01)

(52) U.S. Cl.
CPC ............. *G06T 13/40* (2013.01); *G06T 17/20* (2013.01)

(58) Field of Classification Search
None
See application file for complete search history.

(56) References Cited

PUBLICATIONS

Fisher et al. Design of Tangent Vector Fields. ACM Transactions on Graphics, 2007.
Fu et al., "Sketching Hairstyles," (2007) Eurographics Workshop on Sketch-based Interfaces and Modeling, Hong Kong Unversity of Science and Technology pp. 31-36, XP058211529.
Ward et al., "A Survey on Hair Modeling: Styling, Simulation, and Rendering," (2007) IEEE Transactions on Visualization and Computer Graphics 13(2):213-234.
PCT International Search Report issued to PCT Application No. PCT/NZ2020/050174 dated Jun. 25, 2021.

*Primary Examiner* — Nicholas R Wilson
(74) *Attorney, Agent, or Firm* — Haynes and Boone, LLP (57) ABSTRACT

A representation of a surface of one or more objects is positioned in a virtual space is obtained in a computer animation system. Thereafter, a guide curve specification of a guide curve in the virtual space relative to the surface is received. Thereafter, the computer animation system computes a first set of tangent vector values for differentiable locations along the guide curve and computes a second set of tangent vector values for nondifferentiable locations along the guide curve. Using the first set and second set, the computer animation system computes a third set of tangent vector values for locations on the surface other than locations along the guide curve and computes a tangent vector field over the surface from at least the first set of tangent vector values, the second set of tangent vector values, and the third set of tangent vector values.

22 Claims, 7 Drawing Sheets

METHOD AND USER INTERFACE FOR GENERATING TANGENT VECTOR FIELDS USABLE FOR GENERATING COMPUTER GENERATED IMAGERY

CROSS-REFERENCE TO RELATED APPLICATIONS

This application claims priority to and the benefit of U.S. Provisional Patent Appl. No. 63/088,952, filed Oct. 7, 2020, which is incorporated herein by reference in its entirety.

FIELD OF THE INVENTION

The present disclosure generally relates to computer-generated imagery and more particularly to a system that generates tangent vector fields from user inputs to guide an image generation process.

BACKGROUND

In computer-generated image generation and animation, of images and/or video sequences, there might be a desire to place and animate particular objects over surfaces. In a detailed virtual scene, it could be tedious to individually place each desired object into the virtual scene. Furthermore, if each desired object is placed manually, later revisions of the scene might also be tedious to modify, as it might require an animation artist to move a large number of items, such as individual hairs on a computer animated human or creature, feathers on a bird-like creature, or the like, while having a visually pleasing result. Objects that comprise hair, fur, pelts, plumage, or the like on a shell or surface of a creature (e.g., a person, character, animal, imaginary or fictional creature, and the like), can comprise a large number of individual objects. For example, a creature may have features on their surface, which may extend outward from the surface.

For simple cartoons, for example, this might not be difficult. However, as viewers have come to expect more complex visuals, there is a need for a procedural placement of the objects in a realistic fashion, which can be driven by a computer process instead of requiring an artist to manage each object manually. Some of that computer-driven creature generation might rely on simulation and models to perform more realistic creature generation, movement, and animation.

SUMMARY

According to some embodiments, a computer-implemented method for generating a facial expression in an animation system may include, under control of one or more computer systems configured with executable instructions, obtaining a representation of a surface of one or more objects positioned in a virtual space, receiving a guide curve specification, computing a first set of tangent vector values for differentiable locations along the guide curve, determining a second set of tangent vector values for nondifferentiable locations along the guide curve, computing a third set of tangent vector values, from at least the first set of tangent vector values and the second set of tangent vector values, for locations on the surface other than locations along the guide curve, and computing a tangent vector field over the surface from at least the first set of tangent vector values, the second set of tangent vector values, and the third set of tangent vector values. the surface may be representable by a data structure readable by the one or more computer systems, and the guide curve specification may comprise a guide curve data structure specifying a guide curve in the virtual space relative to the surface.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computer simulation that is used for creature generation may be used to animate creatures and natural movements of the creatures, such as by using a physics engine to output animations and movements of an articulated creature that are consistent with real-world physics and joint constraints. This may be done through one or more algorithms that attempt to automate this process of animating surfaces, body parts, and the like. For example, computer simulation and animation may be used to animate objects on a surface of a character by taking one or a subset of objects on the surface and attempting to place other similar objects on the surface through interpolations and other algorithmic approaches. In some ways, this is often a simple problem—how to determine natural-looking surfaces and surface objects of at most a few dozen attached objects on the surface. For other simulations, such as those with flexible objects, hair or pelts, and the like, the number of degrees of freedom of individual units is much greater and typically computer simulation requires a trade-off between realism, resolution, and amount of computing resources available. Because of this trade-off, efficient computer simulation techniques can be important as they might allow for an increase in realism and/or resolution without requiring significant increases in computing resources.

Thus, creatures generated and animated can be created in computer-readable form procedurally or manually. For example, an image of a sphere might be generated procedurally from a user input of a center location, a radius parameter, and a color. In another example, a more complex object might be generated procedurally from a set of parameters and a set of procedural rules for object creation. Objects might also be created manually, such as by having an artist draw into a computer system the shape of an object. In some cases, an artist might manually adjust a procedurally-generated object and place external objects on that object (e.g., fibers that may correspond to feathers, hairs, fur, and the like), or may utilize algorithmic approaches with external shells of the creature. However, simulation computations involving objects on a surface generally rely on a user to place the object within a three-dimensional (3D) space. The user may specify a direction of placement in order to cause the fibers representing the hair, pelt, feather, or the like to achieve a degree of realism. These processes are time consuming to direct each individual fiber in a specific direction, add texture, color, or shading to a surface, or otherwise have a flow of vectors over a surface.

Realistic hair placement and growth may be performed by using guide curves placed over a target mesh in order to cause hair placement to follow tangent vector fields. A user, such as an artist or other animator, may view a target mesh of a creature in a 3D animation system and interface. The 3D animation may display a mesh that represents a surface as a subdivided surface made up of polygons, such as quadrilaterals, triangles, and the like. The surfaces may also correspond to bicubic surfaces, quadratic surfaces, non-uniform rational basis splines (NURBS) surfaces, an implicit surface, a network of NURBS patches, or the like. For example, a triangulated mesh may be made up of a few or several thousand triangle surfaces that represent a creature, such as a person or animal. Thus, the mesh may be a finely triangulated mesh used in computer animation to attempt to represent a smooth surface through the small individual subdivided surfaces. Originally, the mesh may start as a more coarsely subdivided surface that may be converted and further subdivided into the finer triangulated mesh surface.

Thereafter, as the user views the mesh within the 3D animation system and interface, the user may utilize an input mechanism (e.g., computer mouse, keyboard, trackpad, or the like) to input a guide curve over, nearby, or associated with the mesh. The guide curve may correspond to a two-dimensional (2D) line over the mesh. The guide curve may be used to generate a tangent vector field over the mesh, where the guide curve may represent a growth of fibers, surface objects (e.g., scales, pores, surface protrusions or abrasions, etc.), or the like over the surface in a particular direction or flow. For example, the guide curve may represent a direction that hair swirls or is pointed over the surface, or how feathers may protrude or be aligned over the surface. In this regard, a guide curve may represent a hairstyle or a parting of hair within a hairstyle. In further embodiments, the tangent vector field may also represent different patterns or properties over the surface, such as color flow or patterns, fluid flow or other fluid dynamics, textures, movement of other objects over the surface, and the like.

Thereafter, the 3D computer animation system may determine a tangent vector field over the surface. This may be done by determining tangent vectors from locations along the guide curve, such as points on the guide curve, so that the tangent vectors originate from points along the guide curve and point in the direction of the guide curve. In various embodiments, the user viewing the guide curve may also adjust the direction of the tangent vectors by changing the angle at which the tangent vectors originate from the guide curve, such as in a perpendicular direction or in the opposite flow direction of the guide curve (e.g., from end to start instead of start to end). A first set of tangent vectors may be determined for the points along the guide curve that are differentiable, such as smooth curves and lines of the guide curve (e.g., which may be differentiable from the guide curve and thus have a tangent vector). Further, a second set of tangent vectors may also be generated for nondifferentiable points along the guide curve, such as where cusps, corners, or other jagged edges to the curve may exist. In this regard, the nondifferentiable points may correspond to boundary conditions or points along the curve. A Laplacian conversion or interpolation may be performed on points along the guide curve as those points approach the boundary condition, which may be used to determine tangent vectors at or nearby the nondifferentiable point(s) instead of smoothing such portions of the guide curve to obtain differentiable points. The nondifferentiable point may correspond to a Dirichlet boundary condition. Where references are to points, more generally locations that are on a surface or are at positions relative to the surface or other object might be used as points.

Thereafter, the first and second set of tangent vectors may further be used to determine a third set of tangent vectors over the entire mesh, which may correspond to other points and surfaces over the mesh (e.g., polygonal faces of the mesh). The third set of tangent vectors may therefore correspond to tangent vectors over the entire surface of the creature or object. This third set of tangent vectors may be determined through a smooth interpolation of the first and second set of tangent vectors over the surface. Once determined, a tangent vector field may be determined from the first, second, and third set of tangent vectors. This tangent vector field may then be used as a flow field for objects on the surface or other properties over the mesh. For example, the flow field may be used to designate a flow and pattern for hair or feathers on a person or creature (e.g., real or fantastical). The flow field may also designate other properties over the surface, such as color, fluid flow, shading, textures, and the like. The user viewing the animation interface of the computer animation system, such as the artist or animator, may also designate a strength of the tangent vector field, which may designate how strongly the tangent vectors in the field affect the overall flow (e.g., how much the tangent vectors within the field affect the placement and direction of the corresponding surface properties or object). Thereafter, the user may also manipulate the tangent vector field by changing an angle of the tangent vectors from the guide curve and/or by adding additional guide curves over other sections of the mesh so that the tangent vector field may be further interpolated by additional sets of tangent vectors from differentiable and nondifferentiable points.

Figure 1:
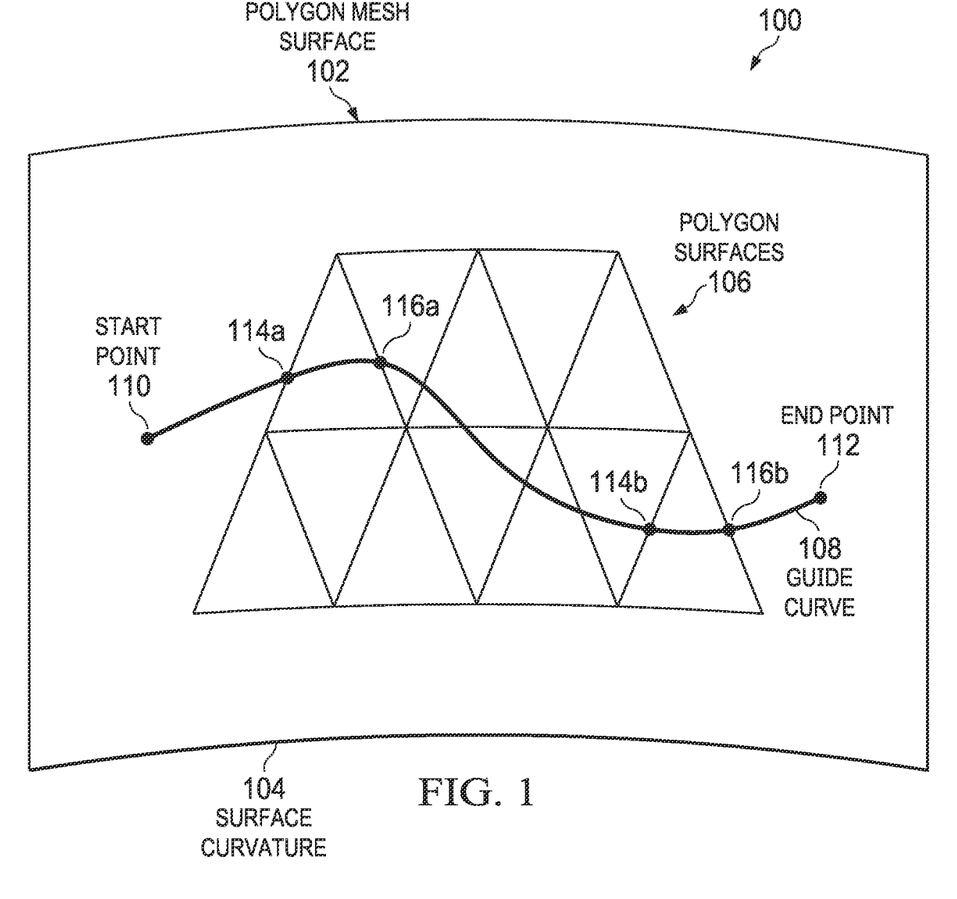
FIG. 1 is a diagram of a triangulated mesh used to represent a surface of a creature during computer animation, in an embodiment.

FIG. 1 is a diagram of a triangulated mesh used to represent a surface of a creature during computer animation, in an embodiment. As illustrated there, environment 100 may be displayed by a computing device and computing display when animating a 3D creature, such as a human, animal, fictional creature, or the like. For example, the computing system may correspond to a computer animation and simulation system configured to animate external fibers on a surface of a creature, as well as other patterns, effects, and properties on the surface. The external fibers may correspond to those objects that are on and/or protrude from the surface of the creature, such as feathers, hairs, fur, and the like. When placing these external fibers over a triangulated mesh surface 102, a subdivided surface of triangulated mesh surface 102 may be used to represent a surface having a surface curvature 104. This subdivided surface may be made up of polygons, such as triangles, quadrilaterals, and the like. For example, triangle surfaces 106 may correspond to polygonal faces of triangulated mesh surface 102 that is used to represent a smooth surface of a creature. In various embodiments, triangulated mesh surface 102 of the animation of the creature partially shown in environment 100 corresponds to a computer animated 3D human or animal.

As shown in environment 100, triangulated mesh surface 102 is shown with a surface curvature 104 for a creature, which may further have 3D shapes, contours, and curves within a 3D animation and simulation system. In order to represent surface curvature 104 in a computer animation system and interface, and allow for placement and growth of hair, feathers, fur, pelts, or the like, triangle surfaces 106 may make up triangulated mesh surface 102. Prior to generating triangle surfaces 106, a coarser mesh of polygons that attempts to represent surface curvature 104 may be used, which may be further subdivided. This may be done through taking an initial given polygon mesh and applying a refinement function to subdivide the surface of the given mesh into smaller surfaces and polygons. This may be applied one or more times, such as in an iterative process, to generate triangulated mesh surface 102 and additional polygonal faces within triangulated mesh surface 102.

One or more approximating and/or interpolating functions or algorithms may be utilized in order to generate triangulated mesh surface 102 as a subdivided surface. Triangulated mesh surface 102 may allow for better or easier placement of application points by allowing for in-plane placement of tangent vectors and a tangent vector field within polygonal faces over a surface of a creature. When placing and/or growing fibers from triangulated mesh surface 102, a pattern of growth, such as pattern or flow of hair or feathers, may be desirable. In this regard, a guide curve 108 may be placed or drawn over triangulated mesh surface 102. Guide curve 108 may have a start point 110 and flow in a direction to end point 112, which includes curves and other differentiable points along guide curve 108. In some embodiments, guide curve 108 may also include nondifferentiable points, as shown further in FIGS. 2 and 3. Guide curve 108 may be used to determine a tangent vector field over the surface in order to generate a flow of fibers or properties over triangulated mesh surface 102.

For example, guide curve 108 is placed or drawn over triangle surfaces 106, where guide curve enters one or more of triangle surfaces 106 at an entry point 114a and an entry point 114b and exits the corresponding one or more of triangle surfaces 106 at an exit point 116a and an exit point 116b. Entry points 114a-b and exit points 116a-b show guide curve 108 as it travels over the corresponding polygonal face within triangulated mesh surface 102. Using this flow of guide curve 108, a tangent vector on each of triangle surfaces 106 may be determined, such as by first determining a first set of vectors for differentiable points along guide curve 108 and then determining a second set of vectors for nondifferentiable points along guide curve 108. This may be done through Laplacian interpolation to determine smooth solutions to tangent vectors. These tangent vectors may be calculated based on a per face value (e.g., per each of triangle surfaces 106), as well as a per vertex value for entry points 114a-b and exit points 116a-b.

Thus, in some embodiments, a per face vector (e.g., a single vector on a single face) may be used to generate a tangent vector field over the entire mesh/surface (e.g., including triangulated mesh surface 102). This may include radiating the field outward from the surface, in a cross or other pattern, a sink or source used to radiate fields, and/or using n-symmetry fields over the entire mesh. In further embodiments, data structures for flow fields over a mesh/surface may also be a per point computation on a surface, including use of tensor fields, vectors, and/or structures of n-components. Nearest neighbors and/or boundary conditions may also be enforced with these flow fields.

Using these values, smooth interpolation over the entire mesh including triangulated mesh surface 102 may be determined. For example, Laplacian conversion may be applied to the linear equations of the first set of tangent vectors as those vectors approach the nondifferentiable point. The boundary condition may correspond to a Dirichlet boundary condition. At and nearby the boundary condition of the nondifferentiable point, the linear equations may be sharp and jagged. However, as a solver moves away from the boundary condition, the equations may again become smooth. Thus, Laplacian interpolation may be used by having the solver create a discontinuity at the nondifferentiable point so that a boundary condition is removed from the linear equations and interpolation may be used to determine the second set of vectors for the nondifferentiable points along guide curve 108. Laplacian interpolation allows for smoothing between two extremes to smooth the tangent vector field over or between faces of triangulated mesh surface 102.

Further, once the boundary condition is set and solved for at the nondifferentiable point, these values may be rapidly resolved for when changed through Cholesky factorization. Thereafter, a tangent vector field may be determined from this first and second set of tangent vectors by calculating a third set of tangent vectors over triangulated mesh surface 102 through further Laplacian interpolations and smoothing over the entire surface. Thereafter, the tangent vector field may be used for flow of fibers and/or properties over the corresponding surface. Further, the tangent vector field may also be used for textures over the surface and/or texturizing the surface, which may include raising or lowering portions of the surface and/or otherwise adding specific textures to the surface. The tangent vector field may be mapped in UV space or 3D space or may be solved as a solution on a mesh or manifold represented in a computer animation system. When mapped into 3D Euclidean space, a sampling may be taken and then applied to an animated surface.

Environment 100 might be implemented by software, interfaces, features and/or functionality of a computer system used by animators or others to specify details that can be used to generate computer-generated imagery such as images and sequences of video frames.

Figure 2:
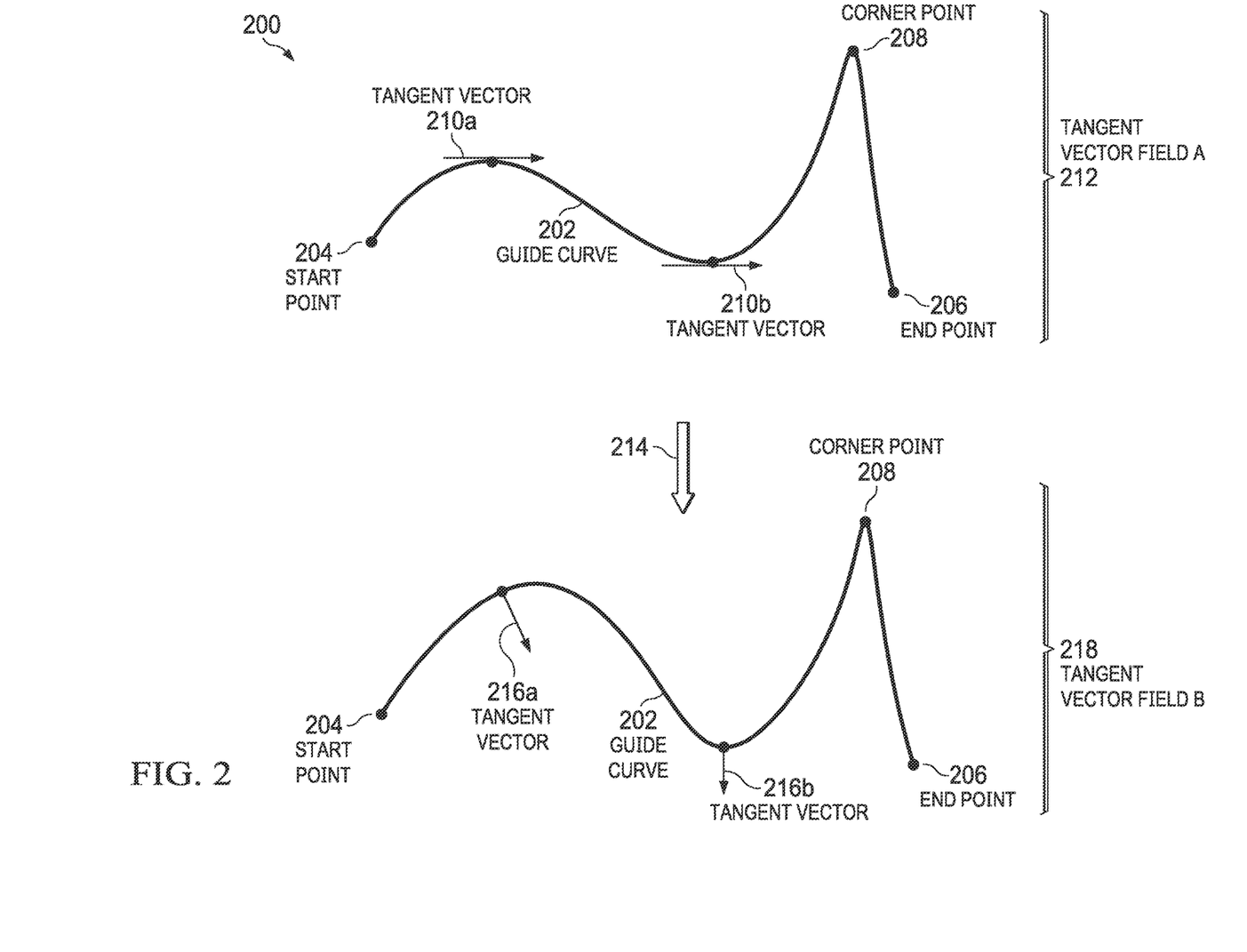
FIG. 2 is a diagram of a guide curve used to determine a tangent vector field, in an embodiment.

FIG. 2 is a diagram of a guide curve used to determine a tangent vector field, in an embodiment. As illustrated there, environment 200 may be displayed by a computing device and computing display when animating a 3D creature, such as a human, animal, fictional creature, or the like. For example, the computing system may correspond to a computer animation and simulation system configured to animate external fibers on a surface of a creature. The external fibers may correspond to those objects that protrude from the surface of the creature, such as feathers, hairs, fur, and the like. When placing these external fibers, patterns, or properties over a surface, a subdivided surface of a target mesh may be used to represent the surface of the creature or object. This subdivided surface may be made up of polygons, such as triangles, quadrilaterals, and the like. Thereafter, a guide curve 202 may be used to represent a pattern over the surface through a tangent vector field, such as to place, orient, or texturize hair, feathers, and the like over the surface.

For example, guide curve 202 may be used to generate one or more tangent vector fields through a direction and strength of vectors within a field over the surface. Guide curve 202 is shown with a start point 204 corresponding to the origin of guide curve 202 as drawn by an artist and/or animator. Guide curve 202 flows to end point 206, which corresponds to the end of guide curve 202 on the surface. Guide curve 202 may have differentiable points over the curve where a derivative of a mathematical representation of guide curve 202 (e.g., in 2D or 3D vector space) may be determined and used to solve for or compute a tangent vector having a slope, direction, and length or strength. Thus, in the representation of guide curve 202, a tangent vector 210a and a tangent vector 210b are shown for differentiable points along guide curve 202. Tangent vector 210a-b may be determined through a derivative of guide curve 202 at corresponding points along guide curve 202 so that a vector is defined from the tangent at those points. However, guide curve 202 may also have nondifferentiable points, such as sharp corners or edges where a derivative and tangent line cannot be determined. The cusp corresponding to corner point 208 may be represented as a boundary condition for a differential, where Laplacian conversions and interpolations using the nearby points approaching corner point 208 are used to determine a tangent vector at corner point 208, for example, by removing the boundary condition and solving for the interpolations using Laplacian conversions to linear equations for the tangent vectors as those approach corner point 202. Further, at the exact point of the nondifferentiable boundary condition of guide curve 202, a value or vector may be automatically assigned to satisfy the nondifferentiable point. For example, the boundary condition may correspond to a Dirichlet boundary condition. Each tangent vector may correspond to one of the polygonal faces or surfaces for the subdivided surface of the mesh.

Using tangent vector 210a and tangent vector 210b, along with other tangent vectors such as those at or nearby corner point 208, a tangent vector field A 212 may be generated. This may be generated for tangent vectors from the differentiable and nondifferentiable points on guide curve 202 and may further include additional tangent vectors determined from Laplacian interpolation over an entire surface for guide curve 202 in environment 200. However, the vector field may also be adjusted so as to have different directions based on an angle of the tangent vectors as the vectors are directed away from guide curve 202. For example, an artist or animator may want the texture generated from the tangent vector field to point in a different direction or have different texturization. In this regard, the computer animation system may utilize rapid resolving, such as through Cholesky factorization, to determine a direction and strength of the tangent vectors for points along guide curve 202. In further embodiments, other factorization may also be used, such as LU factorization.

Thereafter, a change 214 to a tangent vector angle may be received to cause tangent vectors to instead be directed perpendicularly away from guide curve 202. Although both tangent vectors 216a and 216b are shown in a downward direction in FIG. 2, in other embodiments, tangent vector 216a may move in an upward direction while tangent vector 216b has a movements in a downward direction, such as if change 214 requires that tangent vectors 216a/b radiate from a direction towards or away from a particular curvature, direction, or point on, nearby, or associated with guide curve 202. Thereafter, a tangent vector 216a and a tangent vector 216b are determined using a rapid resolving for the tangent vectors to determine the strength and direction of tangent vectors 216a-b (e.g., using Cholesky factorization). Using tangent vector 216a and tangent vector 216b, along with other tangent vectors such as those at or nearby corner point 208, a tangent vector field B 218 may be generated. This may be generated for tangent vectors from the differentiable and nondifferentiable points on guide curve 202 and may further include additional tangent vectors determined from Laplacian interpolation over an entire surface for guide curve 202 in environment 200.

Environment 200 might be implemented by software, interfaces, features and/or functionality of a computer system used by animators or others to specify details that can be used to generate computer-generated imagery such as images and sequences of video frames.

Figure 3:
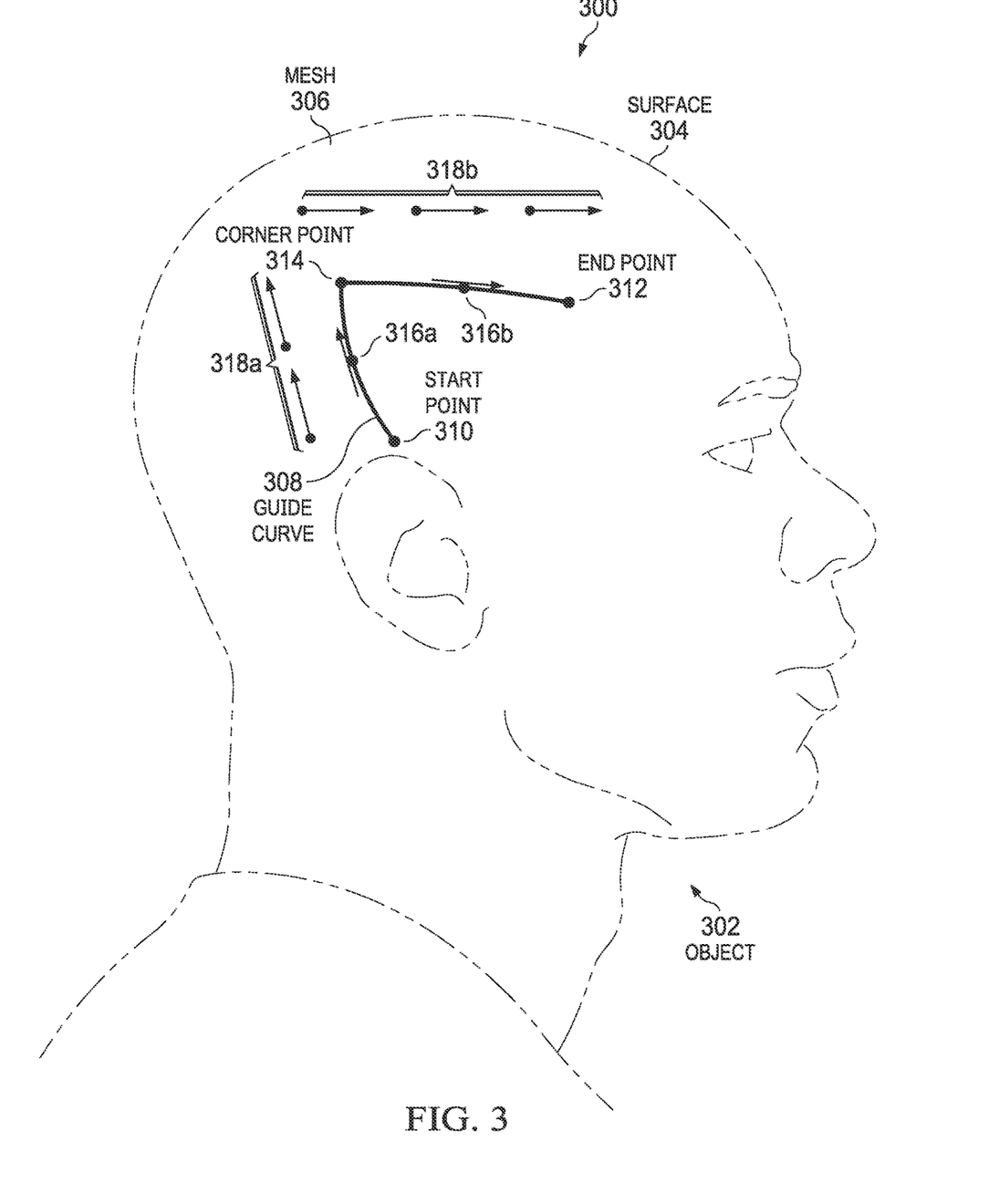
FIG. 3 is a diagram of a creature having a tangent vector field over a mesh representing a surface of the creature, in an embodiment.

FIG. 3 is a diagram of a creature having a tangent vector field over a mesh representing a surface of the creature, in an embodiment. As illustrated there, environment 300 may be displayed by a computing device and computing display when animating a 3D creature, such as a human, animal, fictional creature, or the like. For example, the computing system may correspond to a computer animation and simulation system configured to animate external fibers on a surface of a creature or object, such as object 302. The external fibers may correspond to those objects that protrude from the surface of the creature, such as feathers, hairs, fur, and the like. When placing these external fibers, patterns, or properties over a surface 304 of object 302, a subdivided surface corresponding to a mesh 306 may be used to represent the surface of object 302. This subdivided surface of mesh 306 may be made up of polygons, such as triangles, quadrilaterals, and the like. Thereafter, a guide curve 308 may be used to represent a pattern over surface 304 through a tangent vector field, such as to place, orient, or texturize hair, feathers, and the like over the surface.

Guide curve 308 is shown with a curvature from a start point 310 to an end point 312, and further includes a corner point 314 for a nondifferentiable point along guide curve 308 (e.g., where a tangent cannot be solved for as a derivative of the mathematical representation for guide curve 308 in vector space). In this regard, when determining a tangent vector field over mesh 306 using guide curve 308, a set or plurality of differentiable points on guide curve 308 may be determined to compute a tangent vector 316a and a tangent vector 316b as a first set of tangent vectors. These may be computed by determining the derivative of guide curve 308 at the points for the first set of tangent vectors. However, corner point 314 represents a boundary condition with a tangent vector may not be calculated. Instead, using Laplacian interpolation and Cholesky factorization for points approaching corner point 314, and assigning corner point 314 as a value for a tangent vector, a second set of tangent vectors may be determined for nondifferentiable points, such as at corner point 314.

For example, tangent vectors 316a-b with additional tangent vectors as those approach corner point 314 (e.g., the nondifferentiable point representing the boundary condition) may be solved for as linear equations, where Laplacian conversion may be applied to the linear equations as they approach the boundary condition of corner point 314. Thereafter, a discontinuity in the solver and corresponding solutions may be created at corner point 314. This allows for determination of a tangent vector at corner point 314 without smoothing of corner point 314 on guide curve 308 in order to determine tangent vectors all along guide curve 308. This tangent vector at or nearby corner point 314 may be determined using Laplacian interpolation and rapidly resolved for when changing conditions using Cholesky factorization.

Using the first and second set of tangent vectors, a smooth interpolation solution, including utilisation of Laplacian interpolation, may be used to compute a third set of tangent vectors over all or a portion of surface 304. This may therefore correspond to tangent vectors over the entire surface, where a strength of direction of the tangent vectors may be determined and adjusted based on a cross product as each of the tangent vectors cross an edge. Each tangent vector may correspond to a polygonal surface or face of mesh 306 and may therefore make up a tangent vector field. The tangent vector field therefore has tangent vectors at all or a portion of surface 304 and designates a flow field, such as the flow of hair or feathers on a surface of an animal. Thereafter, fibers or parameters (e.g., color, texture, shading, etc.) may each be adjusted by the tangent vector field over mesh 306. This may include adding hair that has a particular flow or pattern to surface 304 of object 302, or may include addition of other features, such as feathers, a pelt, and the like.

Environment 300 might be implemented by software, interfaces, features and/or functionality of a computer system used by animators or others to specify details that can be used to generate computer-generated imagery such as images and sequences of video frames.

Figure 4:
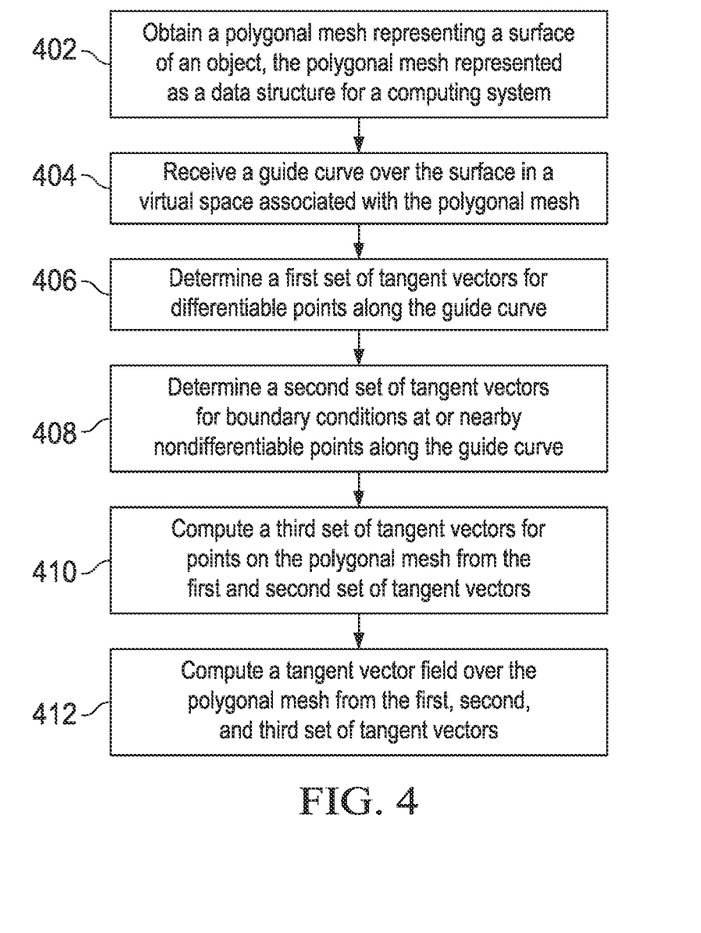
FIG. 4 is a flowchart of an exemplary method as might be performed by computing system when modeling a tangent vector field over a mesh representing a surface, in an embodiment.

FIG. 4 is a flowchart of an exemplary method as might be performed by computing system when modeling a tangent vector field over a mesh representing a surface, in an embodiment. Note that one or more steps, processes, and methods described herein of flowchart 400 may be omitted, performed in a different sequence, or combined as desired or appropriate.

At step 402 of flowchart 400, a polygonal mesh representing a surface of an object is obtained, the polygonal mesh represented as a data structure for a computing system. For example, a smooth surface may be procedurally generated by a computing system using an animation interface and operations as a subdivided surface made up of many (e.g., a few thousand) individual polygonal faces arranges in a mesh pattern. The polygonal mesh therefore allows for representation of a smooth surface of a creature or object and may allow for patterning or texturizing objects and properties over the surface (e.g., hair, feathers, colors, shapes, and the like). Once obtained, at step 404, a guide curve over the surface is received in a virtual space associated with the polygonal mesh. For example, a user, such as an artist or animator, may designate or draw a line or multiple lines over the surface that is used to add texture to the surface. This may be a 2D line or may further correspond to 3D shapes and/or mappings on the subdivided surface for the mesh.

At step 406, a first set of tangent vectors for differentiable points along the guide curve is determined. The first set of tangent vectors may be determined by determining derivatives of points along the curve to obtain a tangent vector having a size, magnitude, or strength and a direction of the vector, such as through Laplacian interpolation and Cholesky factorization. A second set of tangent vectors for boundary conditions at or nearby nondifferentiable points is then determined, at step 408. This may be determined through Laplacian interpolations and Cholesky factorization as the guide curve approaches the nondifferentiable point, such as a cusp or corner on the curve. Further, at the nondifferentiable point, a value may be assigned by the computer animation system for determination of a tangent vector.

At step 410, the computer animation system then computes a third set of tangent vectors for points on the polygonal mesh from the first and second sets of tangent vectors. These third tangent vectors are determined through further interpolations and may be rapidly recalculated when an angle of the tangent vectors from the guide curve is changed by a user, such as an artist or animator. The third set of tangent vectors may correspond to a tangent vector on each surface of the subdivided surface, such as at a center or edge of the polygons in the subdivided surface. This allows for a flow field to be computed and represented as a tangent vector field, which has a particular direction and flow of vectors over the surface, such as a pattern, texture, flow, or other movement and/or position of objects or properties on the subdivided surface. At step 412, a tangent vector field over the polygonal mesh is computed from the first, second, and third set of tangent vectors. Using the tangent vector field, realistic growth of hair, feathers, a pelt or fur, color of fluid flows, and the like may be animated over the 3D creature or object by the computer animation system.

Figure 5:
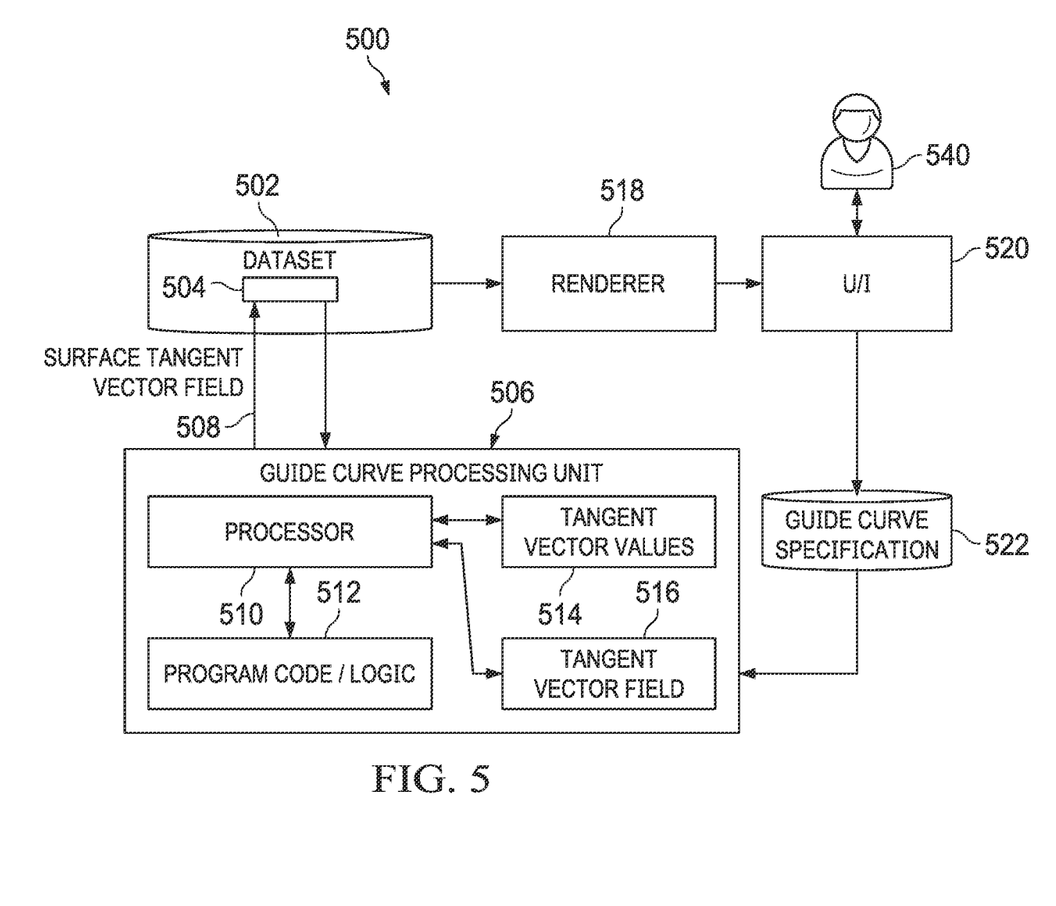
FIG. 5 is a system for utilising clumps of fibers that have been clustered within a computer animation in accordance with an embodiment.

FIG. 5 illustrates a system 500 for utilising clumps of fibers that have been clustered within a computer animation, in an embodiment. System 500 includes a dataset 502, a guide curve processing unit 506, a renderer 518, a user interface (UI) 520, and a guide curve specification 522.

A user 540 may interact with the UI 520 to access, load, and/or define one or more surfaces for which a tangent vector field may be generated over the surface(s) based on guide curve specification 522. A surface may therefore be pre-generated or may be generated by user 540 when performing the methods and/or processes described herein for tangent field vector determination. Guide curve specification 522 may indicate, for example, a 2D curve or specification over the surface in a 2D or 3D space. Guide curve specification 522 may include, for example, a number of points, a line, a spline, a curve, or the like in a virtual space corresponding to the surface. This may include disposing guide curve specification 522 over the surface. Dataset 502 may store data for different surfaces, including a stored surface 504, that may be stored and/or loaded (e.g., characters, creatures, or objects). Dataset 502 may load data available to user 540 via UI 520 from a source of an animation stored by dataset 502, such as a tessellated mesh, subdivision surface, or the like, which is used to define a surface. Further dataset 502 may include fibers to use with a tangent vector field over a surface (e.g., a pelt, feather groom, coat, robe, cloak, etc.). Thus, in some embodiments, guide curve specification 522 may be placed over or nearby stored surface 504 loaded to UI 520 from dataset 502.

Guide curve processing unit 506 may utilize the methods and processes described herein to take guide curve specification 522 with any additional surface data from dataset 502 and/or user 540, and thereafter perform the tangent vector field operations herein. This may generate a tangent vector field 516 that defines a flow field over the corresponding surface based on guide curve specification 522, thereby more easily animating fibers, patterns, and/or properties over the surface according to the flow field. The guide curve processing unit 506 may calculate and generate tangent vector field 516 for the surface using tangent vector values 514. Tangent vector values 514 may correspond to those tangent vectors at differentiable points and nondifferentiable points along guide curve specification 522 with additional tangent vectors over the surface from smooth interpolations of the tangent vectors corresponding to guide curve specification 522, as described herein. Further, the flow field defined from tangent vector field 516 may be adjusted in strength and direction through further inputs by user 540 including changing an angle and/or strength of tangent vector values 514 with respect to guide curve specification 522, as described herein.

Guide curve processing unit 506 includes a processor 510 that executes program code 512 to take as input guide curve specification with a surface, calculate tangent vector values 514, and use tangent vector values 514 to calculate tangent vector field 516. Guide curve processing unit 506 may further store surface tangent vector field 508 for a specific surface and guide curve specification 522 to dataset 502 so that the corresponding tangent vector field 516 from tangent vector values 514 may be used. This includes use with renderer 518 when rendering a scene having the surface and corresponding flow field used for fibers, patterns, and/or properties over the surface. For example, guide curve processing unit 506 may initiate the process by taking guide curve specification 522 with any additional data from dataset 502, and thereafter determining tangent vector field 516 through tangent vector values 514, which may include those determined from Laplacian interpolation and Cholesky factorization for points approaching nondifferentiable points. Further, tangent vector field 516 may be determined from additional tangent vectors over the surface based on smooth interpolations of tangent vector values 514 along guide curve specification 522. Based on tangent vector field 516, guide curve processing unit 506 may then provide any flow fields over a surface as surface tangent vector field 508 for storage by dataset 502. This allows for reproduction of the corresponding flow field over a surface based on tangent vector field 516. Guide curve processing unit 506 may then move to the next surface and guide curve designated by user 540 and further perform additional flow field determination as requested. The resulting surfaces, flow fields, fibers, and the like that have been animated and stored by dataset 502 may further be rendered by rendered 518 and/or output to user 540 to inspect the results.

Figure 6:
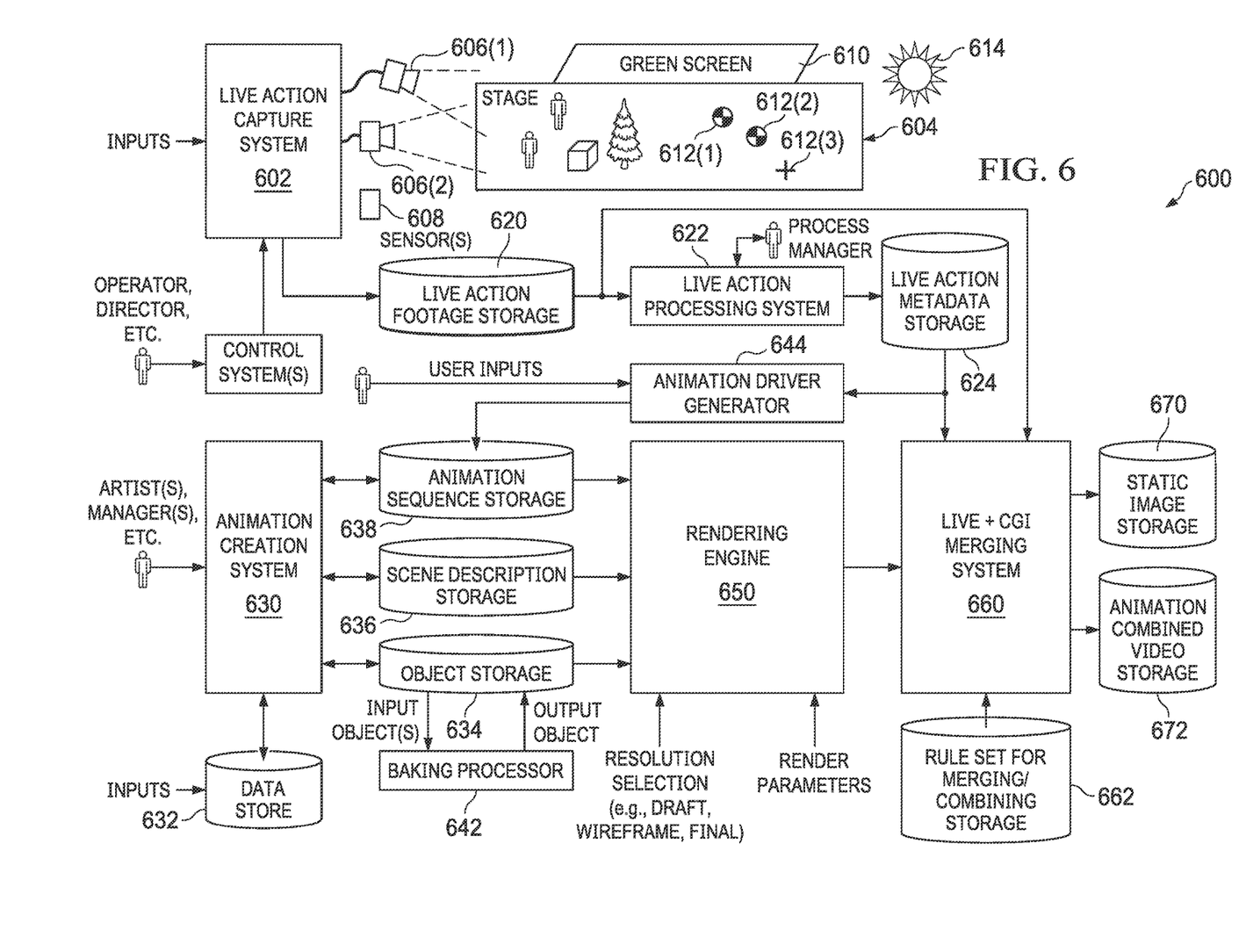
FIG. 6 is an example visual content generation system as might be used to generate imagery in the form of still images and/or video sequences of images, according to various embodiments.

Visual content generation system 600 (see FIG. 6) is configured to receive the values of guides curves over a target mesh in environments 100, 200, and 300 as input and output one or more static images and/or one or more animated videos, for example, using system 500 of FIG. 5. The static image(s) and/or the animated video(s) include one or more visual representations of a target mesh having a pattern generated from tangent vector fields over the target mesh. For example, FIG. 6 illustrates the example visual content generation system 600 as might be used to generate imagery in the form of still images and/or video sequences of images. Visual content generation system 600 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 600 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 600 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 6, a live action capture system 602 captures a live scene that plays out on a stage 604. Live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture ("mo-cap") detectors, etc.). On stage 604, there might be human actors, animal actors, inanimate objects, background objects, and possibly an object such as a green screen 610 that is designed to be captured in a live scene recording in such a way that it is easily overlaid with computer-generated imagery. Stage 604 might also contain objects that serve as fiducials, such as fiducials 612(1)-(3), that might be used post-capture to determine where an object was during capture. A live action scene might be illuminated by one or more lights, such as an overhead light 614.

During or following the capture of a live action scene, live action capture system 602 might output live action footage to a live action footage storage 620. A live action processing system 622 might process live action footage to generate data about that live action footage and store that data into a live action metadata storage 624. Live action processing system 622 might include computer processing capabilities, image processing capabilities, one or more processors, program code storage for storing program instructions executable by the one or more processors, as well as user input devices and user output devices, not all of which are shown. Live action processing system 622 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 614, as that might be useful in post-processing to match computer-generated lighting on objects that are computer-generated and overlaid on the live action footage. Live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of visual content generation system 600. Animation creation system 630 might include computer processing capabilities, image processing capabilities, one or more processors, program code storage for storing program instructions executable by the one or more processors, as well as user input devices and user output devices, not all of which are shown. Animation creation system 630 might be used by animation artists, managers, and others to specify details, perhaps programmatically and/or interactively, of imagery to be generated. From user input and data from a database or other data source, indicated as a data store 632, animation creation system 630 might generate and output data representing objects (e.g., a horse, a human, a ball, a teapot, a cloud, a light source, a texture, etc.) to an object storage 634, generate and output data representing a scene into a scene description storage 636, and/or generate and output data representing animation sequences to an animation sequence storage 638.

Scene data might indicate locations of objects and other visual elements, values of their parameters, lighting, camera location, camera view plane, and other details that a rendering engine 650 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 630 might be interactive, allowing a user to read in animation sequences, scene descriptions, object details, etc. and edit those, possibly returning them to storage to update or replace existing data. As an example, an operator might read in objects from object storage into a baking processor 642 that would transform those objects into simpler forms and return those to object storage 634 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 632 might be used to drive object presentation. For example, if an artist is creating an animation of a spaceship passing over the surface of the Earth, instead of manually drawing or specifying a coastline, the artist might specify that animation creation system 630 is to read data from data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 644 might read in live action metadata, such as data representing movements and positions of body parts of a live actor during a live action scene. Animation driver generator 644 might generate corresponding animation parameters to be stored in animation sequence storage 638 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 622. Animation driver generator 644 might convert that movement data into specifications of how joints of an articulated CGI character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 650 might include computer processing capabilities, image processing capabilities, one or more processors, program code storage for storing program instructions executable by the one or more processors, as well as user input devices and user output devices, not all of which are shown.

Visual content generation system 600 can also include a merging system 660 that merges live footage with animated content. The live footage might be obtained and input by reading from live action footage storage 620 to obtain live action footage, by reading from live action metadata storage 624 to obtain details such as presumed segmentation in captured images segmenting objects in a live action scene from their background (perhaps aided by the fact that green screen 610 was part of the live action scene), and by obtaining CGI imagery from rendering engine 650.

A merging system 660 might also read data from rule sets for merging/combining storage 662. A very simple example of a rule in a rule set might be "obtain a full image including a two-dimensional pixel array from live footage, obtain a full image including a two-dimensional pixel array from rendering engine 650, and output an image where each pixel is a corresponding pixel from rendering engine 650 when the corresponding pixel in the live footage is a specific color of green, otherwise output a pixel value from the corresponding pixel in the live footage."

Merging system 660 might include computer processing capabilities, image processing capabilities, one or more processors, program code storage for storing program instructions executable by the one or more processors, as well as user input devices and user output devices, not all of which are shown. Merging system 660 might operate autonomously, following programming instructions, or might have a user interface or programmatic interface over which an operator can control a merging process. In some embodiments, an operator can specify parameter values to use in a merging process and/or might specify specific tweaks to be made to an output of merging system 660, such as modifying boundaries of segmented objects, inserting blurs to smooth out imperfections, or adding other effects. Based on its inputs, merging system 660 can output an image to be stored in a static image storage 670 and/or a sequence of images in the form of video to be stored in an animated/combined video storage 672.

Thus, as described, visual content generation system 600 can be used to generate video that combines live action with computer-generated animation using various components and tools, some of which are described in more detail herein. While visual content generation system 600 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 7:
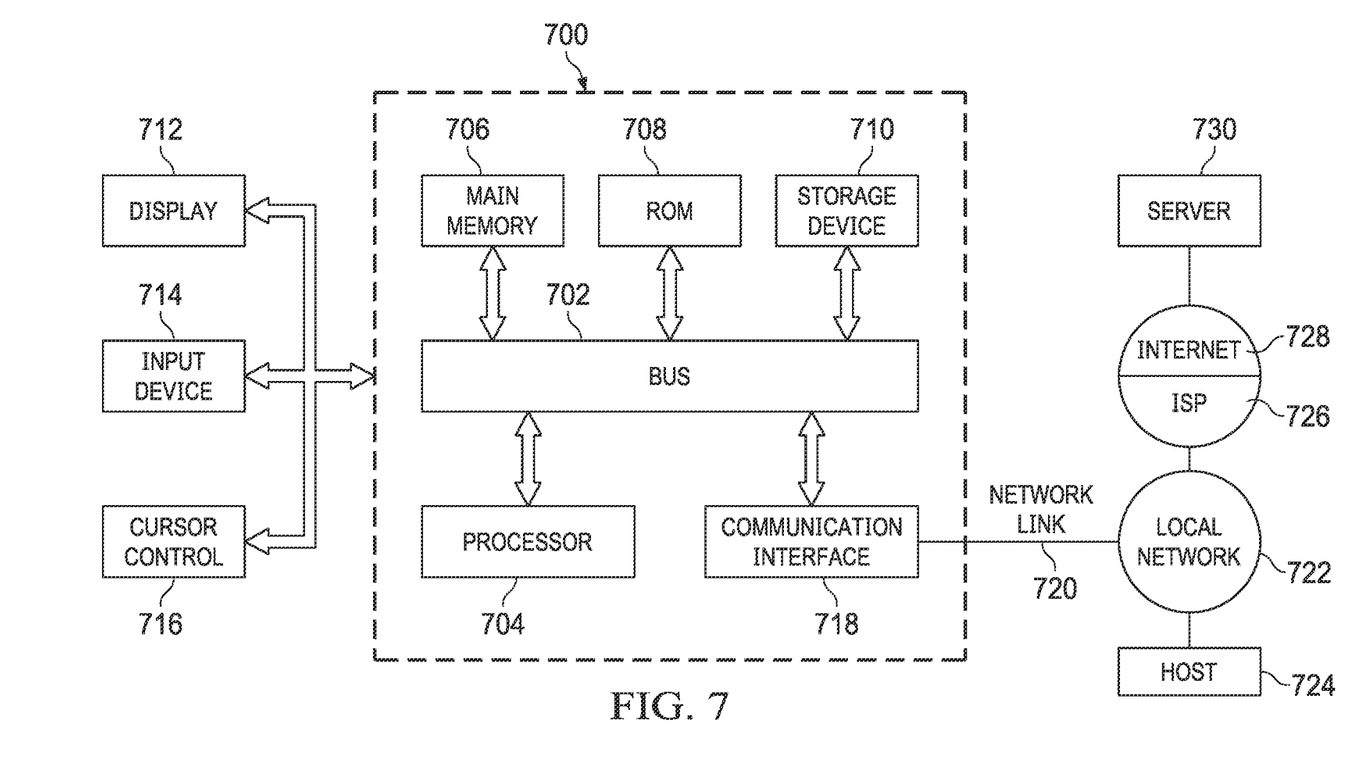
FIG. 7 is a block diagram illustrating an example computer system upon which computer systems of the systems illustrated in FIGS. 1 and 5 may be implemented.

For example, FIG. 7 is a block diagram that illustrates a computer system 700 upon which the computer systems of the systems described herein and/or visual content generation system 600 (see FIG. 6) may be implemented. Computer system 700 includes a bus 702 or other communication mechanism for communicating information, and a processor 704 coupled with bus 702 for processing information. Processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 may also be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a computer monitor, for displaying information to a computer user. An input device 714, including alphanumeric and other keys, is coupled to bus 702 for communicating information and command selections to processor 704. Another type of user input device is a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be a network card, a modem, a cable modem, or a satellite modem to provide a data communication connection to a corresponding type of telephone line or communications line. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720, and communication interface 718. In the Internet example, a server 730 might transmit a requested code for an application program through the Internet 728, ISP 726, local network 722, and communication interface 718. The received code may be executed by processor 704 as it is received, and/or stored in storage device 710, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for processing a flow field over a representation of a surface, usable for animation over the representation of the surface in a computer graphics generation system, the method comprising:
    obtaining a representation of a surface of one or more objects positioned in a virtual space, wherein the surface is representable by a data structure readable by the one or more computer systems;
    receiving a guide curve specification, wherein the guide curve specification comprises a guide curve data structure specifying a guide curve in the virtual space relative to the surface;
    computing a first set of tangent vector values for differentiable locations along the guide curve;
    determining a second set of tangent vector values for nondifferentiable locations along the guide curve;
    computing a third set of tangent vector values, from at least the first set of tangent vector values and the second set of tangent vector values, for locations on the surface other than locations along the guide curve; and
    computing a tangent vector field over the surface from at least the first set of tangent vector values, the second set of tangent vector values, and the third set of tangent vector values.

2. The computer-implemented method of claim 1, further comprising applying elements to a scene description of a scene in the virtual space wherein the elements conform to, or align with, the tangent vector field.

3. The computer-implemented method of claim 1, wherein the surface is defined by a mesh represented by geometric shapes, and wherein the geometric shapes comprise three or more edges and representable by at least one of a set of vertices, a set of edges, or planar faces.

4. The computer-implemented method of claim 3, wherein the tangent vector field comprises tangent vectors for each face of a set of faces of the mesh.

5. The computer-implemented method of claim 3, wherein the tangent vector field comprises tangent vectors for each vertex of a set of vertices of the mesh.

6. The computer-implemented method of claim 5, wherein a particular tangent vector field for a particular vertex is an average of face tangent vectors of faces adjacent to the particular vertex.

7. The computer-implemented method of claim 1, wherein computing the second set of tangent vectors comprises computing a solution to one or more equations of a family of equations with the guide curve as a component of the one or more equations.

8. The computer-implemented method of claim 7, wherein the family of equations comprises Laplacian equations.

9. The computer-implemented method of claim 1, wherein the guide curve is provided by user input from a user after viewing a display of the one or more objects represented by the surface.

10. The computer-implemented method of claim 9, further comprising mapping the user input onto the surface such that the guide curve is on the surface.

11. The computer-implemented method of claim 10, wherein the guide curve specification includes a conformance factor specifying a degree to which the tangent vector field conforms to the first set of tangent vector values and the second set of tangent vector values at locations near the guide curve.

12. The computer-implemented method of claim 1, wherein the guide curve specification includes a tangent vector field source, a tangent vector field sink, and a guide curve path.

13. The computer-implemented method of claim 12, wherein the surface is defined by a polygon mesh represented by polygons having three or more edges and representable by a set of vertices, a set of edges, and planar faces, and wherein the guide curve path is a piecewise-linear curve aligned with mesh faces of the polygon mesh.

14. The computer-implemented method of claim 1, wherein the guide curve specification further comprises a curve option, selected from a parallel option and a perpendicular option, and wherein computing the tangent vector field comprises computing tangent vectors on the guide curve as vectors parallel to the guide curve when the parallel option is selected and computing the tangent vectors on the guide curve as vectors perpendicular to the guide curve when the perpendicular option is selected.

15. The computer-implemented method of claim 1, further comprising using Cholesky factorization to determine an initial set of tangent vectors.

16. The computer-implemented method of claim 1, wherein the surface is defined as a two-dimensional surface and the virtual space is a three-dimensional virtual space.

17. The computer-implemented method of claim 1, wherein the second set of tangent vector values comprises zero or more tangent vector values.

18. The computer-implemented method of claim 1, wherein tangent vector field designates the flow field for one or more directions of fibers attached to the surface, and wherein the fibers comprise one of hairs, fur, or feathers.

19. The computer-implemented method of claim 1, wherein the tangent vector field designates the flow field for one of a property over the surface or a pattern over the surface.

20. A computer system for processing a flow field over a representation of a surface, usable for animation over the representation of the surface in a computer graphics generation system, the computer system comprising:
- at least one processor; and
- a computer-readable medium storing instructions, which when executed by the at least one processor, causes the computer system to perform operations comprising:
  - obtaining a representation of a surface of one or more objects positioned in a virtual space, wherein the surface is representable by a data structure readable by the one or more computer systems;
  - receiving a guide curve specification, wherein the guide curve specification comprises a guide curve data structure specifying a guide curve in the virtual space relative to the surface;
  - computing a first set of tangent vector values for differentiable locations along the guide curve;
  - determining a second set of tangent vector values for nondifferentiable locations along the guide curve;
  - computing a third set of tangent vector values, from at least the first set of tangent vector values and the second set of tangent vector values, for locations on the surface other than locations along the guide curve; and
  - computing a tangent vector field over the surface from at least the first set of tangent vector values, the second set of tangent vector values, and the third set of tangent vector values.

21. A system comprising: at least one processor, and a storage medium storing instructions, which when executed by the at least one processor, cause the system to implement the computer-implemented method of claim 1.

22. A non-transitory computer-readable storage medium storing instructions, which when executed by at least one processor of a computer system, causes the computer system to carry out the computer-implemented method of claim 1.

* * * * *